(12) United States Patent
Parish et al.

(10) Patent No.: US 11,774,004 B2
(45) Date of Patent: Oct. 3, 2023

(54) PRESSURIZED DUAL PACKING SEAL VALVE

(71) Applicant: Flowserve Pte. Ltd., Singapore (SG)

(72) Inventors: Paul Jeffrey Parish, Spanish Fork, UT (US); Michael P. Nelson, Lehi, UT (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 17/485,674

(22) Filed: Sep. 27, 2021

(65) Prior Publication Data

US 2023/0096922 A1 Mar. 30, 2023

(51) Int. Cl.
*F16K 41/00* (2006.01)
*F16K 41/02* (2006.01)
*F16K 37/00* (2006.01)

(52) U.S. Cl.
CPC ........ *F16K 41/003* (2013.01); *F16K 37/0091* (2013.01); *F16K 41/02* (2013.01)

(58) Field of Classification Search
CPC ..... F16K 41/003; F16K 41/02; F16K 37/0091
USPC ....................................................... 251/214
See application file for complete search history.

(56) References Cited

U.S. PATENT DOCUMENTS

| 3,776,558 | A | * | 12/1973 | Maurer | F16J 15/008 |
| | | | | | 277/914 |
| 4,270,760 | A | * | 6/1981 | Greiman | F16J 15/183 |
| | | | | | 277/350 |
| 4,451,047 | A | * | 5/1984 | Herd | F16K 15/02 |
| | | | | | 277/540 |
| 4,878,677 | A | * | 11/1989 | Larkins | F16J 15/183 |
| | | | | | 366/331 |
| 4,899,899 | A | * | 2/1990 | Junier | F16J 15/183 |
| | | | | | 220/581 |
| 5,290,046 | A | * | 3/1994 | Houston | F16J 15/183 |
| | | | | | 277/516 |
| 5,365,971 | A | | 11/1994 | Bergamini | |
| 5,540,253 | A | * | 7/1996 | Junier | F16K 41/003 |
| | | | | | 137/240 |
| 2001/0032952 | A1 | * | 10/2001 | Lah | F16J 15/187 |
| | | | | | 251/214 |
| 2003/0041651 | A1 | | 3/2003 | Krieger | |

(Continued)

OTHER PUBLICATIONS

International Search Report and Written Opinion for PCT Appl. No. PCT/US2022/043349 dated Dec. 27, 2022, 9 pages.

*Primary Examiner* — William M McCalister

(74) *Attorney, Agent, or Firm* — Maine Cernota & Rardin

(57) ABSTRACT

A valve configured to control a flow of a process fluid includes a pair of packing seals separated by a seal gap space along a linear valve stem of the valve, and a pressurization port that can be used to apply a pressurizing fluid, such as nitrogen gas, to the seal gap at a gap pressure that is higher than the process fluid pressure, thereby ensuring that any leakage past the packing seals will be of pressurizing fluid into the process fluid and/or into the environment, and that no process fluid will escape into the environment. The pressure or flow rate of the pressurizing fluid can be monitored to detect and quantify any pressurization fluid leakage past either of the packing seals, so that a maintenance action can be applied to the valve, such as re-tightening or replacing at least one of the packing seals, or replacing the valve.

7 Claims, 4 Drawing Sheets

(56) References Cited

U.S. PATENT DOCUMENTS

| | | | |
|---|---|---|---|
| 2005/0151107 A1* | 7/2005 | Shu | F16K 3/243 |
| | | | 251/214 |
| 2007/0085279 A1* | 4/2007 | Burdick | F16K 41/04 |
| | | | 277/510 |
| 2013/0139888 A1* | 6/2013 | Gablonski | F16J 15/182 |
| | | | 137/1 |
| 2014/0077109 A1* | 3/2014 | Miyashita | F16K 31/122 |
| | | | 251/63.5 |
| 2016/0025688 A1* | 1/2016 | Gamache | F16K 27/0236 |
| | | | 137/512.3 |
| 2016/0109035 A1 | 4/2016 | Mccarty | |
| 2016/0131261 A1 | 5/2016 | Stephenson | |
| 2017/0292606 A1 | 10/2017 | Bergamini | |

\* cited by examiner

PRESSURIZED DUAL PACKING SEAL VALVE

STATEMENT OF GOVERNMENT INTEREST

Portions of the present invention may have been made in conjunction with Government funding under contract number DE-NA0003525, and there may be certain rights to the Government.

FIELD OF THE INVENTION

The invention relates to valves, and more particularly, to valves that form a seal using packing.

BACKGROUND OF THE INVENTION

For critical valve applications where even the smallest amount of external valve leakage is not acceptable, a bellows seal valve is typically used.

With reference to the sectional diagram of FIG. 1, a bellows seal valve comprises an accordion-like bellows 100. One end 102 of the bellows 100 is welded or attached to the valve stem 104. The other end 106 of the bellows 100 is welded to a part 108 that can be clamped or otherwise attached to the valve bonnet 109. When operating the valve, the valve stem 104 is moved in a linear valve stroke so as to control the position of a valve plug 110 relative to a valve seat 112. During the valve stroke, the bellows 100 compresses or expands along with the linear motion of the sliding valve stem 104.

Since the bellows 100 has a static seal at each end 102, 106, and the circumference of the valve stem 104 is covered by the bellows 100, a metal barrier between the process fluid inside of the valve and the external atmosphere is provided, eliminating leakage at the valve stem 104. In the example of FIG. 1, the process fluid is outside of the bellows 100, and the atmosphere is inside of the bellows 100. For other bellows valves, the process fluid is inside of the bellows 100 and the atmosphere is outside of the bellows 100.

Because the metal bellows 100 is flexed as the valve stem 104 is moved, over time the bellows 100 will ultimately crack and fail. To prevent leakage due to a bellows failure, a set of packing 114 is provided above the bellows 100 to provide a second seal.

Unfortunately, implementing a bellows valve can be costly. Furthermore, if the bellows 100 were to develop a leak path, the process fluid in the example of FIG. 1 would leak from the outside surface of the bellows 100, through the leak path, into the inside area of the bellows 100. The valve fluid would then be sealed from the outside environment only by the valve stem packing 114 in the gland area 116 of the valve. If the valve stem packing 114 were to leak, then the process fluid would escape to the outside atmosphere. Since valve stem packing 114 typically allows a higher level of leakage than a bellows 100, there is a high probability that if the bellows 100 were to developed a leak path, at least some process fluid would escape through the bellows 100 and valve stem packing 114 to the outside environment.

What is needed, therefore, is a reliable valve design that is less prone to leakage than conventional bellows valves, while also being less expensive than conventional bellows valves.

SUMMARY OF THE INVENTION

The present invention is a reliable valve design that is less prone to leakage than conventional bellows valves, while also being less expensive than conventional bellows valves.

According to the present invention, a linear stroke valve includes a pair of packing seals that are spaced apart by a gap space along the valve stem, for example within a gland area of the valve. Leakage through the packing seals is prevented by introducing a pressurizing fluid, such as nitrogen, into the gap space between the packing seals and maintaining the pressurizing fluid at a gap pressure that is higher than the process fluid pressure so as to ensure that any leakage past the packing seals will be of the pressurizing fluid into the process fluid or into the environment, while any escape of the process fluid into the environment is prevented.

Assuming that there is little or no leakage past the packing seals, the volume between the packing seals will normally be constant and static, and there will normally be no flow of the pressurization fluid into the valve once the desired pressure of the pressurizing fluid is established within the valve. In embodiments, the pressure and/or flow rate of the pressurizing fluid is monitored, so that any leakage of the pressurizing fluid through either or both of the packing seals is easily detected as a decrease in the pressure and/or as an increased flow rate of the pressurizing fluid into the valve. Depending on the application of the valve, leakage of small amounts of the pressurizing fluid into the process fluid and/or into the environment may be tolerable. However, once the flow rate and/or pressure drop of the pressurizing fluid exceeds a specified maximum, then a maintenance action can be applied to the valve, for example by re-tightening or replacing the packing, or replacing the valve.

In some embodiments where the disclosed valve is implemented for a high temperature oxidizing application, the pressurizing gas can serve to protect inner rings of the packing seals by displacing oxygen away from them. Oxidizing resistant rings of packing can be placed on the outsides of the packing seals to protect inner rings that might otherwise be oxidized. In some of these embodiments, this arrangement further protects the valve fluid from oxygen ingress when the process fluid is drained from the system and a vacuum is created that might otherwise suck air into the valve from the outside environment.

One general aspect of the present invention is a valve system comprising a valve. The valve includes a valve seat; a valve plug configured to control a flow of process fluid through the valve according to a separation between the valve plug and the valve seat; a valve stem in mechanical communication with the valve plug and configured such that linear actuation of the valve stem controls the separation between the valve plug and the valve seat; first and second packing seals surrounding the valve stem, each of the packing seals forming a seal between the valve stem and a surrounding gland housing, the first and second packing seals being separated from each other along the valve stem by a seal gap, and a seal pressurization port configured to allow a seal pressurizing fluid to enter into the seal gap and to be pressurized within the seal gap to a desired gap pressure.

Embodiments further include a pressurization fluid source, a pressurizing fluid pressure regulating apparatus, and a pressurization fluid line that provides fluid communication between the pressurization fluid source and the seal pressurization port of the valve. Some of these embodiments further include a pressure measuring device configured to measure a pressure of the pressurizing fluid within the gap space. Any of these embodiments can further include a flow measuring device configured to measure a flow rate of the pressurizing fluid into the gap space.

Another general aspect of the present invention is a method of preventing process fluid leakage along a valve stem of a linear stroke valve. The method includes providing a valve system according to the first general aspect, determining or estimating a process pressure of the process fluid, and applying a pressurizing fluid to the seal pressurization port, the pressurizing fluid being pressurized to a gap pressure that is higher than the process pressure.

Embodiments further include monitoring at least one of a pressure of the pressuring fluid and a flow rate of the pressurizing fluid.

In any of the above embodiments, the method can further include, if the monitored pressure or the monitored flow rate changes by more than a specified amount, determining that a leak has developed in the valve, and applying a maintenance action to the valve. In some of these embodiments, the maintenance action includes at least one of re-tightening at least one of the packing seals, replacing at least one of the packing seals, and replacing the valve.

And in any of the above embodiments, the pressurizing fluid can be nitrogen gas.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a reliable valve design that is less prone to leakage than conventional bellows valves, while also being less expensive than conventional bellows valves.

Figure 1:
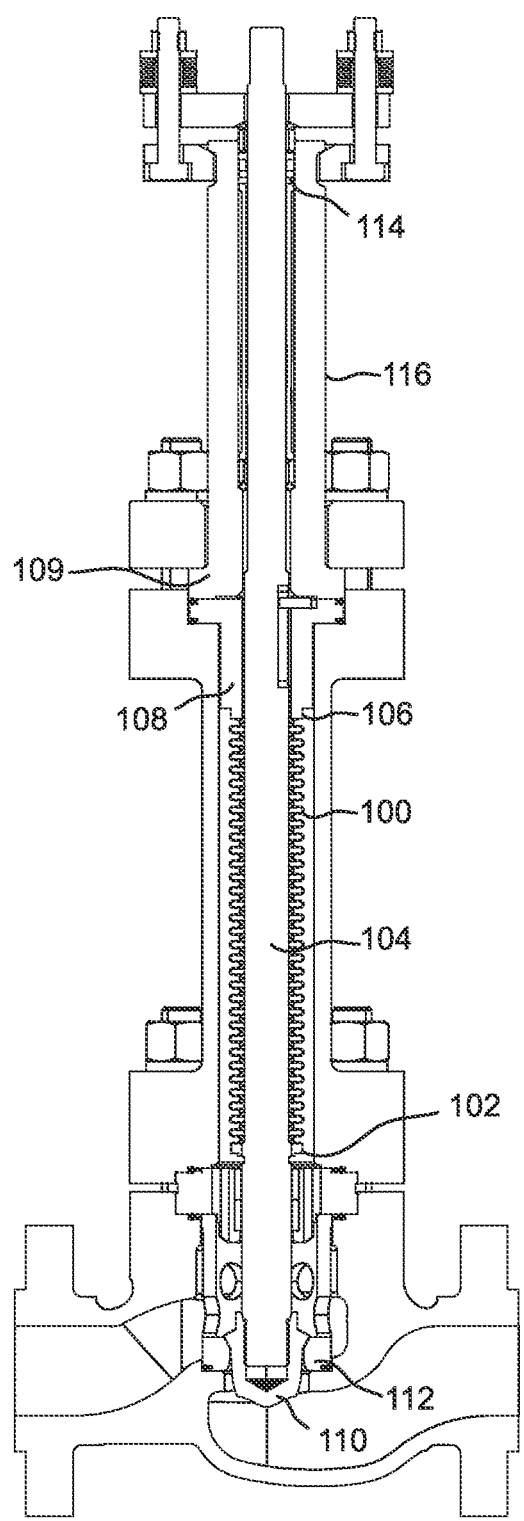
FIG. 1 is a sectional view of a bellows valve of the prior art.
Figure 2:
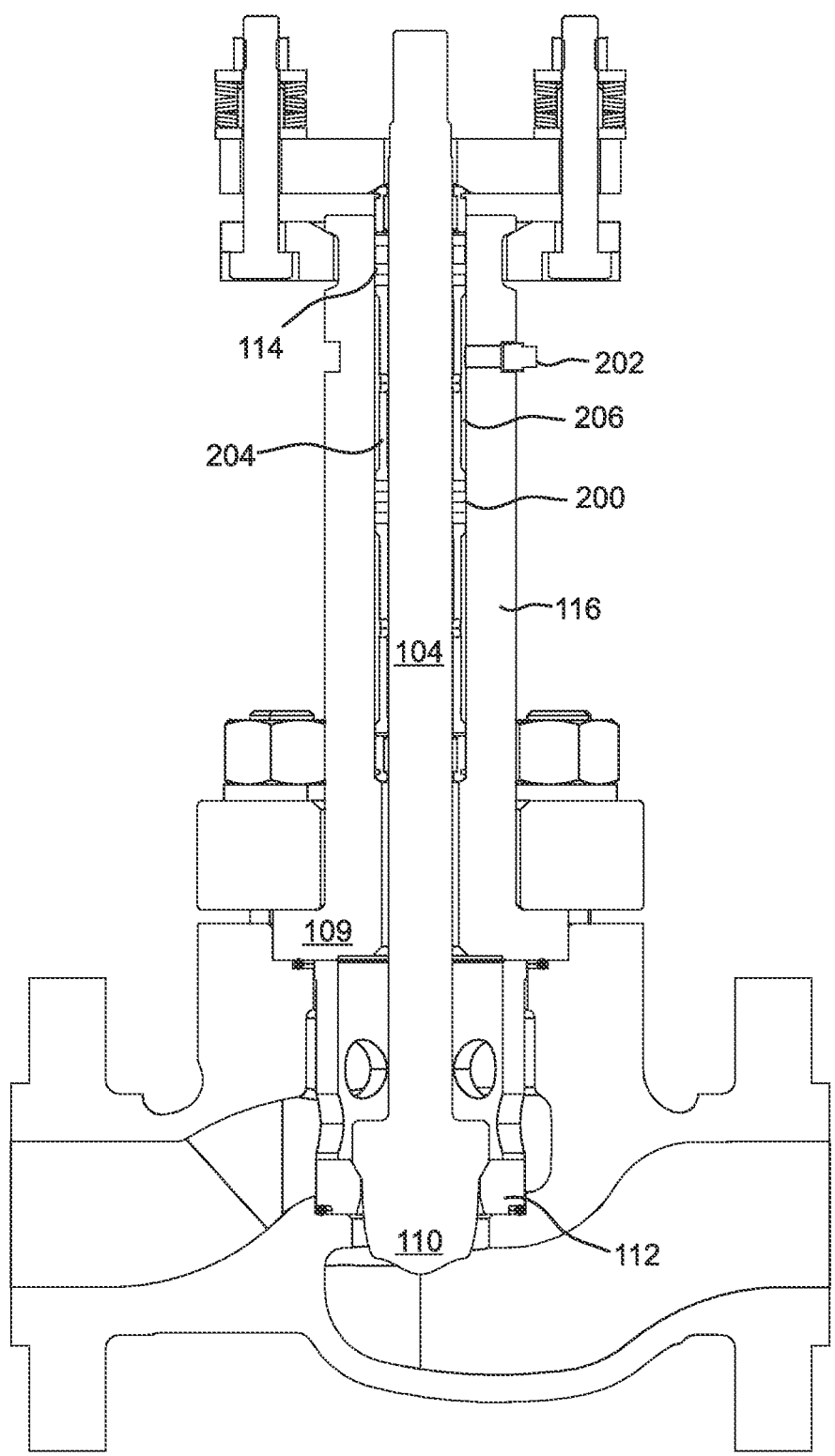
FIG. 2 is a sectional view drawn to scale of an embodiment of the present invention.

With reference to FIG. 2, according to the present invention a seal is formed with the valve stem 104 of a linear stroke valve by a pair of packing seals 114, 200 that are separated from each other along the valve stem 104 by a seal gap 206. In the example of FIG. 2, the packing seals 114, 200 are both located within a gland area of the valve, and a spacer 204 is provided within the gap space 206.

Figure 3:
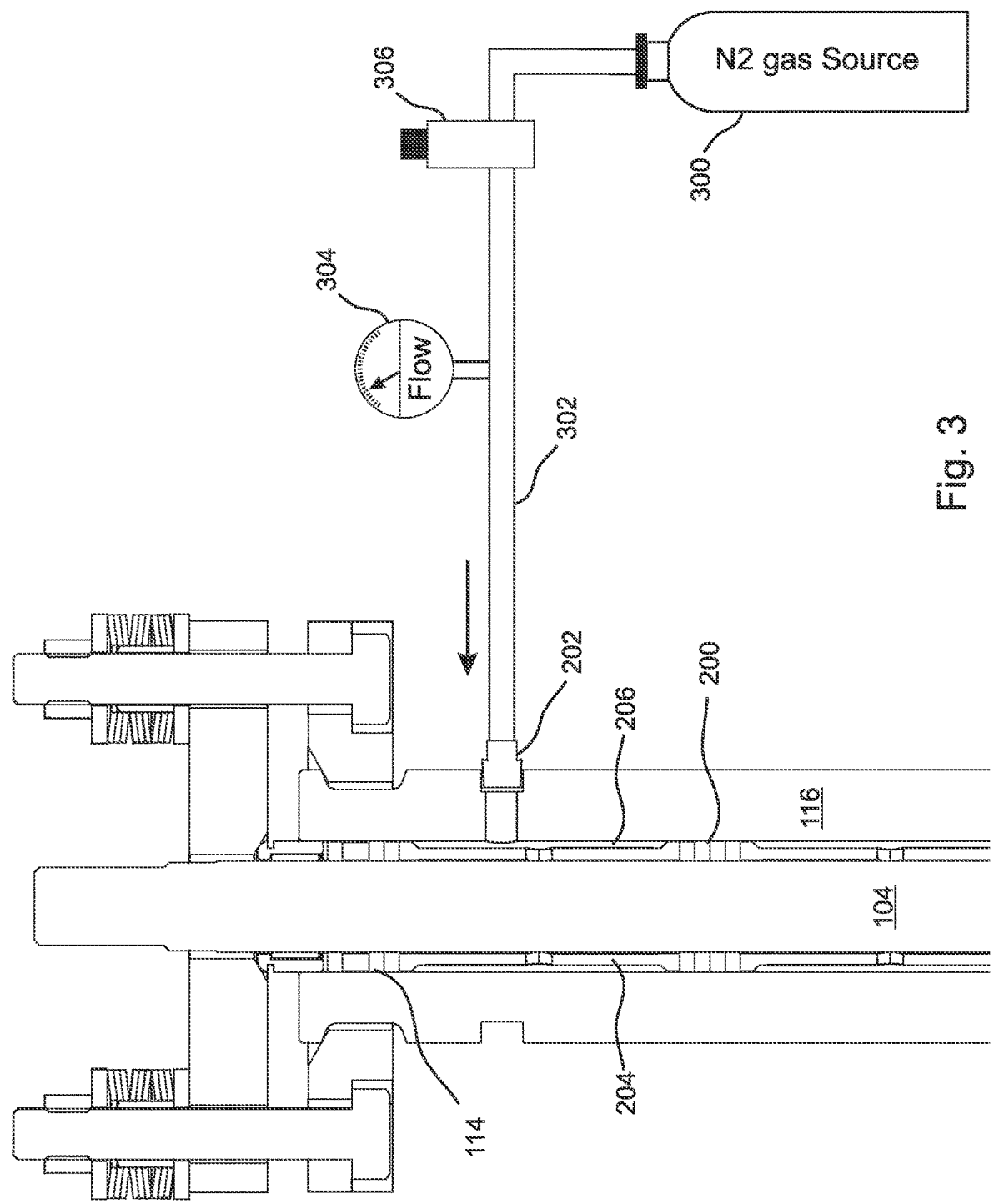
FIG. 3 is a side view of a valve system according to an embodiment of the present invention, with the valve drawn to scale.

The valve further includes a pressurization port 202. With reference to FIG. 3, the pressurization port 202 can be used to inject a pressurizing fluid, such as nitrogen gas 300, through a pressurizing fluid transfer line 302 into the gap space 206 between the packing seals 114, 200. A pressure regulating device 306 can then be used to establish and maintain the pressurizing fluid within the gap space 206 at a higher pressure than the process fluid, thereby ensuring that any leakage past the packing seals 114, 200 will be of the pressurizing fluid into the process fluid and/or into the environment, while any escape of the process fluid into the environment will be prevented.

Assuming that there is little or no leakage past the packing seals 114, 200, the volume of the gap 206 between the packing seals 114, 200 will normally be constant and static, and there will normally be no flow 304 of the pressurization fluid into the valve once the desired gap pressure of the pressurizing fluid is established within the gap space 206.

Figure 4:
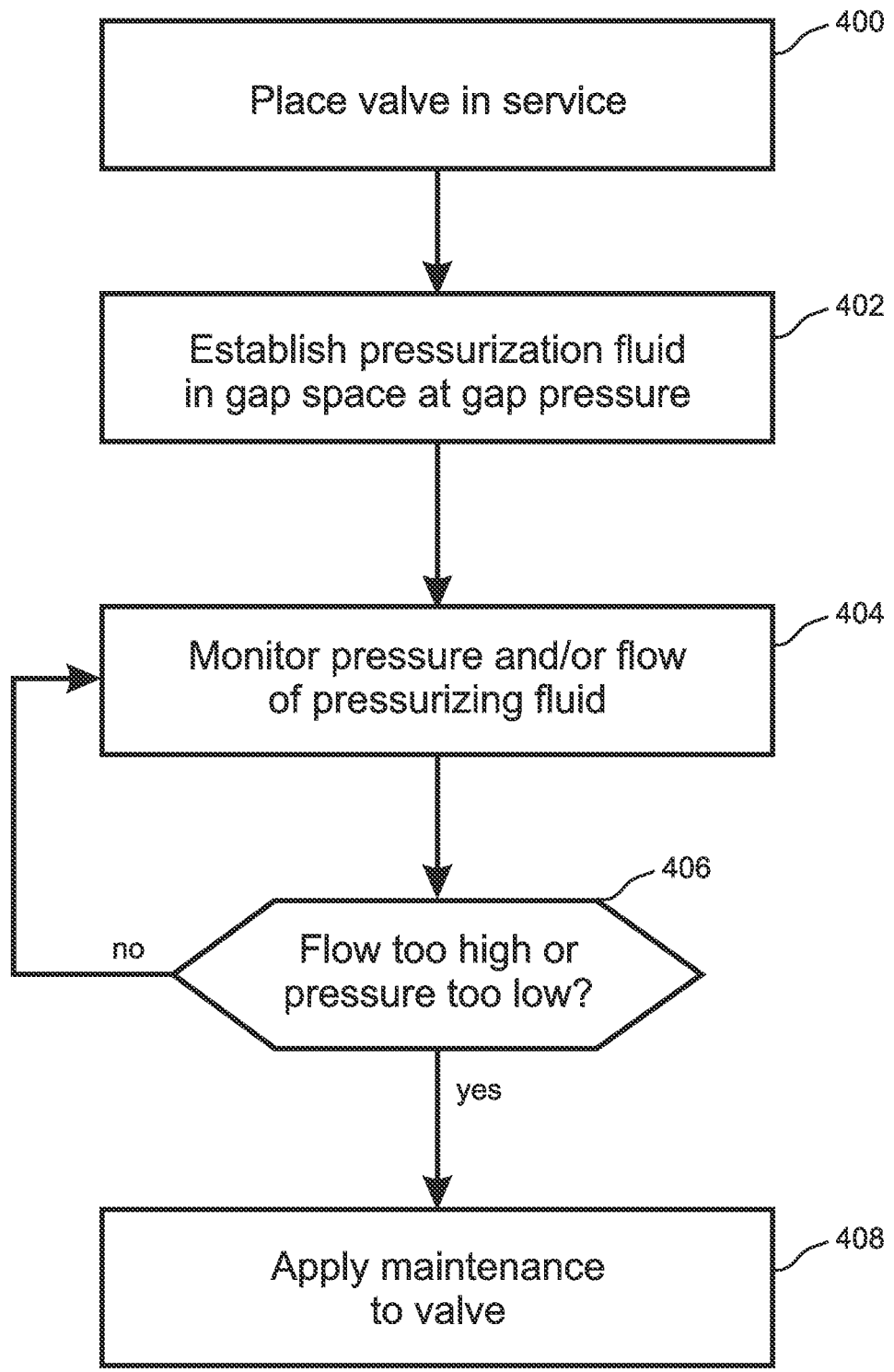
FIG. 4 is a flow diagram indicating a method of the present invention.

With reference to FIG. 4, in embodiments, after placing the valve in service 400 and establishing 402 the pressurizing fluid within the gap space 206 between the packing seals 114, 200 at the desired gap pressure, the pressure and/or flow rate of the pressurizing fluid is monitored 404, for example using a flow gage 304 as shown in FIG. 3, so that any leakage of the pressurizing fluid past either or both of the packing seals 114, 200 is easily detected and quantified as a decrease in the pressure and/or increase in the flow rate of the pressurizing fluid. Depending on the application of the valve, leakage of small amounts of the pressurizing fluid into the process fluid and/or into the environment may be tolerable. However, once the flow rate and/or pressure drop of the pressurizing fluid exceeds a specified maximum level 406, a maintenance action can be applied 408 to the valve, for example by re-tightening or replacing one or both of the packing seals 114, 200, or replacing the valve.

In some embodiments where the disclosed valve is implemented for a high temperature oxidizing application, the pressurizing gas can serve to protect the inner rings of the packing seals 114, 200 by displacing oxygen away from them. Oxidizing resistant rings of packing can be placed on the outsides of the packing seals 114, 200 to protect inner rings that might otherwise be oxidized. In some of these embodiments, the invention further protects the process fluid from oxygen ingress when the process fluid is drained from the system and a vacuum is created that might otherwise suck air into the valve from the outside environment.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A valve system comprising:
    a valve, the valve comprising:
        a valve seat;
        a valve plug configured to control a flow of process fluid through the valve according to a separation between the valve plug and the valve seat;
        a valve stem in mechanical communication with the valve plug and configured such that linear actuation of the valve stem controls the separation between the valve plug and the valve seat;

first and second packing seals surrounding the valve stem, each of the packing seals forming a seal between the valve stem and a surrounding gland housing, the first and second packing seals being separated from each other along the valve stem by a seal gap, a spacer being provided within the seal gap, the first and second packing seals being adjacent to opposing ends of the spacer; and a seal pressurization port configured to allow a seal pressurizing fluid to enter into the seal gap and to be pressurized within the seal gap to a desired gap pressure;

a pressurization fluid source configured to supply the pressurizing fluid;

a pressurization fluid line through which the pressurizing fluid flows from the pressurization fluid source to the seal pressurization port of the valve, a pressurizing fluid pressure regulating apparatus configured to regulate a pressure of the pressurizing fluid in the pressurization fluid line; and a flow measuring device configured to measure a flow rate of the pressurizing fluid from the pressurizing fluid pressure regulating apparatus to the seal gap, said flow of the pressurizing fluid being unrestricted between the pressurizing fluid pressure regulating apparatus and the seal pressurization port of the valve;

wherein the seal pressurizing fluid that leaks past the first packing seal flows between the valve stem and the gland housing and is released directly into the environment, thereby requiring an increased flow rate of the pressurizing fluid into the seal gap so as to maintain the desired gap pressure; and wherein the seal pressurizing fluid that leaks past the second packing seal flows between the valve stem and the gland housing and is released directly into the process fluid, thereby requiring an increased flow rate of the pressurizing fluid into the seal gap so as to maintain the desired gap pressure.

2. The valve system of claim 1, further comprising a pressure measuring device configured to measure a pressure of the pressurizing fluid within the seal gap.

3. A method of preventing process fluid leakage along a valve stem of a linear stroke valve, the method comprising:
   providing a valve system according to claim 1;
   determining or estimating a process pressure of the process fluid;
   applying the pressurizing fluid to the seal pressurization port, the pressurizing fluid being pressurized to a gap pressure that is higher than the process pressure;
   monitoring the flow rate of the pressurizing fluid from the pressurizing fluid pressure regulating apparatus to the seal gap; and
   applying a maintenance action to the valve after the monitored flow rate changes by more than a specified amount.

4. The method of claim 3, further comprising monitoring a pressure of the pressurizing fluid in the pressurization fluid line.

5. The method of claim 4, further comprising applying the maintenance action to the valve after the monitored pressure changes by more than a specified amount.

6. The method of claim 3, wherein the maintenance action includes at least one of:
   re-tightening at least one of the packing seals;
   replacing at least one of the packing seals; and
   replacing the valve.

7. The method of claim 3, wherein the pressurizing fluid is nitrogen gas.

* * * * *